Feb. 14, 1950     H. A. HICKS     2,497,261
VEHICLE BODY CONSTRUCTION
Filed Dec. 21, 1946     2 Sheets-Sheet 1
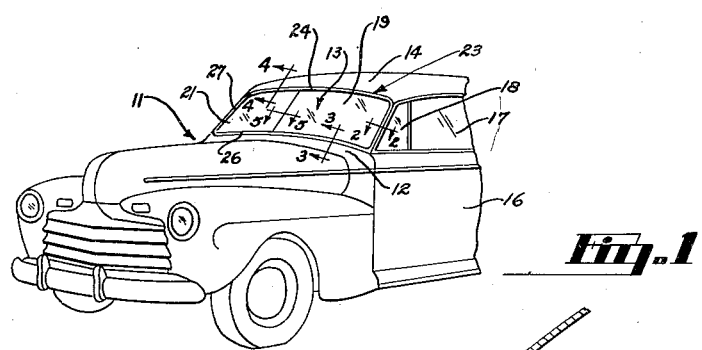
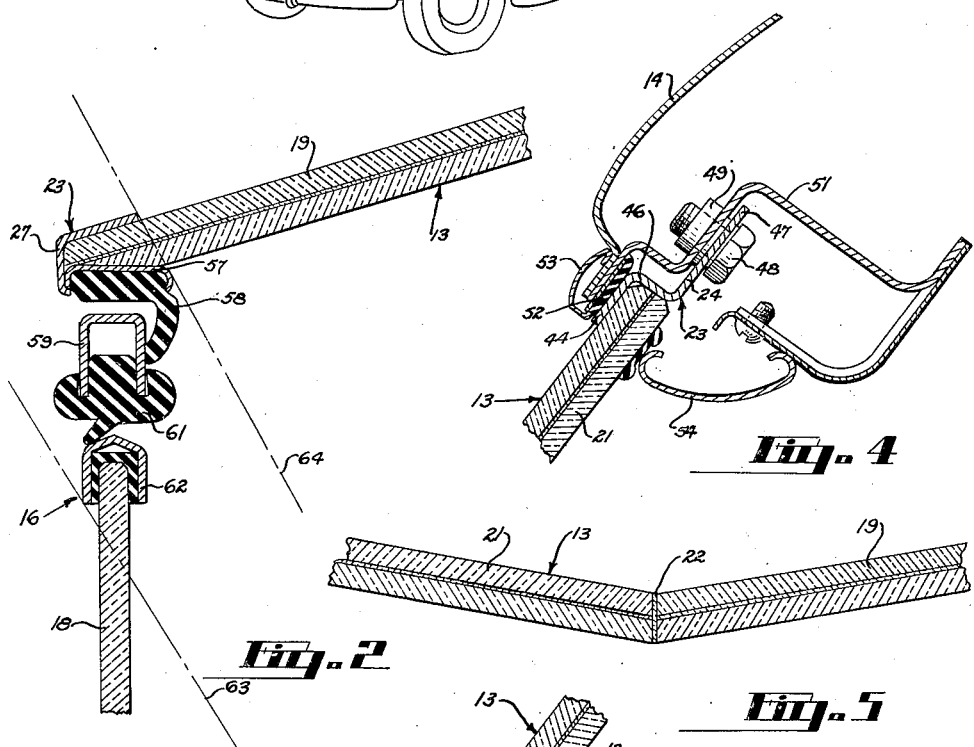
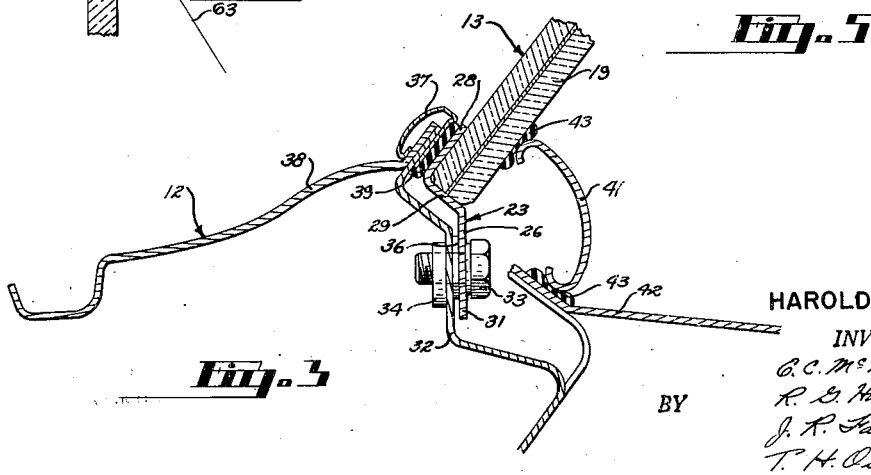
HAROLD A. HICKS
INVENTOR.
BY
ATTORNEYS Feb. 14, 1950 H. A. HICKS 2,497,261
VEHICLE BODY CONSTRUCTION
Filed Dec. 21, 1946 2 Sheets-Sheet 2

HAROLD A. HICKS
INVENTOR.

BY
ATTORNEYS.

Patented Feb. 14, 1950

2,497,261

UNITED STATES PATENT OFFICE 2,497,261

VEHICLE BODY CONSTRUCTION

Harold A. Hicks, Detroit, Mich., assignor to Ford Motor Company, Dearborn, Mich., a corporation of Delaware Application December 21, 1946, Serial No. 717,633

2 Claims. (Cl. 296—84)

This invention relates to a vehicle body construction for motor vehicles.

In conventional vehicle body construction the sheet metal roof panel is supported at its forward edge by the windshield side pillars. These pillars are fabricated of sheet metal and are made sufficiently large and strong to transmit the compression and tension loads which pass between the cowl and the roof panel. In addition, the pillars are formed in such fashion as to have considerable strength in lateral bending, and thus are able to properly resist twisting loads to which the roof panel is subjected when the car is operating over rough roads. In present practice the windshield is completely floated in rubber channels so that the glass will not be subjected to or take any loads.

Although the conventional construction briefly described above provides adequate supporting strength for the roof panel, it is subject to one principal disadvantage, namely, the windshield front pillars are necessarily of such width as to seriously interfere with the vision of the driver. In closed body types the obstruction formed by the windshield side pillar, the windshield frame and the door frame, when viewed from the normal position of the driver's eye, presents a sight block measuring nearly four inches in width. This results in the well-known "blind spot" which, according to statistics, is the cause of a considerable portion of traffic accidents. Besides being a negative factor in the safety drive to decrease the ever increasing number of traffic accidents, the blind spots formed by the windshield side pillars are an important factor in driver fatigue since the knowledge that his vision is incomplete naturally increases the nervous tension to which a driver is subjected.

It is accordingly a principal object of the present invention to provide a vehicle body construction in which the driver's vision is greatly improved with a resulting increase in safety and in driving comfort. Furthermore, the present invention accomplishes this aim without sacrificing the strength of the body. This is achieved by completely eliminating the usual windshield side pillars and by rigidly connecting the windshield glass to the cowl and also to the roof panel so that the glass itself can transmit tension, compression and shear. Thus, the functions of the side pillars are taken over by the windshield, and the obstruction to the driver's vision is reduced to a minimum. While the door frame and the sealing strip will still remain within the range of sight, the width of the resulting obstruction will be considerably less than half that of the conventional construction. This relatively narrow obstruction will not provide blind spots in the driver's field of view, since the characteristics of binocular vision afforded by man's two laterally spaced eyes enable the driver to "see around" this narrow obstacle.

Another object of the invention is to provide a vehicle body construction in which the windshield glass is surface bonded or cemented to narrow metallic mounting members which in turn are rigidly secured to the cowl and to the roof panel of the body. A structure of maximum strength is thus obtained since the loads are distributed throughout the windshield glass and are not concentrated at certain points.

A further object is to provide simple yet effective sealing means in a windshield construction of the type described above.

Still another object of the present invention is to provide a vehicle body construction utilizing the windshield glass as a structural member and also utilizing rubber in shear to provide a somewhat yieldable connection for transmitting loads between the body and roof panel.

Other objects and advantages of this invention will be made more apparent as this description proceeds, particularly when considered in connection with the accompanying drawings, in which:

Figure 1 is a fragmentary perspective view of a motor vehicle embodying the present invention.

Figures 2, 3, 4 and 5 are cross sectional views taken substantially upon the planes indicated by lines 2—2, 3—3, 4—4 and 5—5 of Figure 1.

Figure 6:
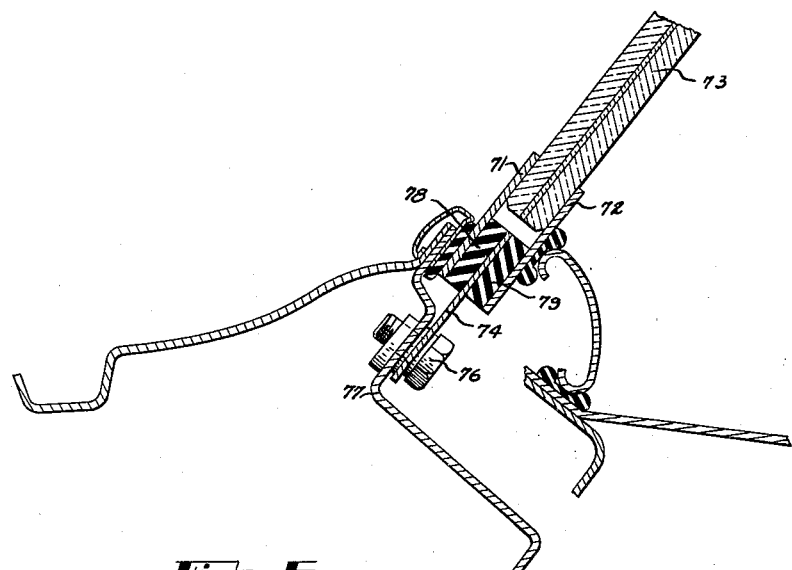
Figure 6 is a cross sectional view similar to Figure 3 but illustrating a modified construction.

Referring now more particularly to the drawings, and to the embodiment of the invention shown in Figures 1 to 5 inclusive, the reference character 11 indicates a vehicle body having a cowl 12, windshield 13, roof panel 14, and front door 16. The door houses the conventional sliding window 17 and the pivoted ventilating window 18.

The windshield 13 is constructed of laminated safety glass and may be somewhat thicker than in the usual automobile since in the present invention it forms a structural part of the body. It is formed in two sections, a left hand section 19 and a right hand section 21. As best seen in Figure 5, the two windshield sections 19 and 21 are arranged in the form of a wide V, and are joined at their adjacent edges by a cemented joint. While various types of joints are feasible, that shown comprises a thin sheet of vinyl plastic 22 cemented between the adjacent edges of the windshield sections. In this manner a weatherproof joint is formed between the windshield sections and yet the driver's vision is not impaired as in the usual type of V windshield in which rubber channels and metal supporting strips are used.

In the illustrated embodiment of the invention the windshield 13 is mounted in a narrow sheet metal frame 23 extending completely around the periphery of the windshield. As will be described more in detail hereinafter, the windshield frame 23 is rigidly connected to the cowl 12 and to the roof panel 14 of the vehicle body so that the windshield forms a structural part thereof. The frame 23 comprises top and bottom sections 24 and 26 respectively and side sections 27.

Referring to Figure 3, it will be seen that the bottom section 26 of the windshield frame has an upper flange 28 cemented to the outer surface of the windshield section 19, an intermediate section 29 cemented to the edge of the windshield glass and a downwardly depending supporting flange 31. Any suitable cementing material, such as a rubber base plastic cement commonly used to join together two dissimilar materials, or a silver solder material used for the same purpose, may be used to provide a bond between the windshield glass and the metal frame. It will be noted that the windshield frame is cemented to one surface only of the windshield glass. While, if desired, the frame may be constructed in such fashion as to be cemented to both sides of the glass, adequate strength is provided by the construction shown and the assembly problem is greatly reduced with attendant saving in cost. The supporting flange 31 of the windshield frame is bolted at a plurality of spaced points to a sheet metal panel 32 forming part of the cowl construction. In the present instance the fastening means comprise cap screws 33 passing through enlarged holes in the supporting flange 31 to provide for manufacturing variations, and threaded into clinch nuts 34 at the inner side of the panel 32. The clinch nuts are provided with serrations adapted to bite into the panel 32 to lock the nuts in place. Suitable spacers 36 are provided between the supporting flange 31 and the cowl panel 32.

A suitable molding strip 37 conceals the joint between the vertical panel 32 of the cowl and the horizontal panel 38 thereof, and also conceals an elastic sealing strip 39 positioned between the upper flange 28 of the window frame and the molding strip 37. The sealing strip 39 provides a weather tight seal preventing the entrance of air and moisture into the body. Viewed from the interior of the body, a garnish molding 41 is suitably secured to the cowl and is insulated from the windshield glass and the dash 42 by binding strips 43. From the foregoing description it will be apparent that the windshield glass 13 is rigidly mounted upon the cowl 12 of the body. Not only is a rigid connection formed therebetween, but the load is equally distributed over the surface of the glass by the cemented bond formed between the glass and the windshield frame 23.

Reference is now made to Figure 4 for an illustration of the connection between the upper portion of the windshield and the roof panel 14. In general, this connection is similar to that provided between the windshield and the cowl. The top section 24 of the windshield frame is formed with a lower flange 44 and an intermediate section 46 suitably cemented or bonded to the face and edge respectively of the windshield glass. The upper supporting flange 47 of the frame is secured by cap screws 48 and clinch nuts 49 to a sheet metal structural member 51 forming a part of the roof panel construction. At the outer side of the windshield, a resilient sealing strip 52 is provided, being supported between the lower flange 44 of the windshield frame and the molding strip 53. A garnish molding 54 conceals the structure at the joint when viewed from the interior of the vehicle.

It will now be clearly seen that the front portion of the roof panel 14 is adequately supported from the cowl 12 of the body by means of the windshield 13. Compression and tension loads, as well as shear loads, are carried by the windshield, thus obviating the necessity for the usual windshield side pillars conventionally used in vehicle body construction. The elimination for the need of such pillars makes it possible to greatly reduce the obstruction to the driver's vision formerly occasioned by the necessity for providing relatively wide windshield side pillars at the corners of the windshield.

Attention is now invited to Figure 2, which is a horizontal cross sectional view through the side of the windshield and the forward portion of the front door. It will be noted that the side sections 27 of the metal windshield frame are formed with an angle shaped cross section and are cemented to the forward face and to the edge of the windshield glass. If desired, the side sections of the windshield frame can be completely eliminated and the frame replaced by separate upper and lower metal supporting strips secured to the windshield glass and to the cowl and roof panel in the same manner as the upper and lower sections of the frame are secured thereto. However, the elimination of the side sections of the frame is not conducive to eliminating the obstruction to the driver's vision, since of necessity there must be a sealing strip between the body and the door and also a frame carried by the door for the door glass, and the side section of the windshield frame is concealed by these other members, when viewed from the position of the driver's eyes.

A metal channel 57 is cemented to the beveled edge of the windshield glass and is adapted to carry a rubber sealing strip 58. The sealing strip 58 yieldably contacts the window frame 59 carried by the front door 16. The window frame 59 is channel shaped and supports at its rearward edge a rubber sealing strip 61 which in turn engages the frame 62 of the pivoted ventilating window 18 of the door. With this construction the overall width of the obstruction to vision at the corner of the body is reduced to a minimum.

The lines 63 and 64 in Figure 2 are radii drawn from the normal position of the driver's eyes and are tangent to the window frame 62 and the metal channel 57. The space between the lines 63 and 64 thus remains an obstruction to the vision of the driver, but it will be noted that the overall width of this construction is relatively small and can be in the order of 1½ inches wide or even narrower, whereas the width of the corresponding obstruction existing in conventional vehicle bodies is approximately four inches. Furthermore, the narrow obstruction resulting from the use of the present invention does not create blind spots for the driver, since the binocular vision afforded by two laterally spaced eyes is such as to enable either one eye or the other to see exterior objects between the lines 63 and 64. Although this characteristic of man's vision also assists somewhat when driving a conventional vehicle, the excessive width of the ordinary windshield side pillars and door frame construction is such that a blind spot still remains. Thus, with the present invention the driver has practically unobstructed vision resulting not only in the elimination of many traffic accidents but also in increased driver comfort since the nervous strain of driving is greatly reduced by the knowledge the driver has that he is able to see all objects both in front and to the side of the vehicle.

In the modification shown in Figure 6, flat metal strips 71 and 72 are cemented to opposite faces of the windship glass 73 and extend beneath the bottom edge of the glass. A third metal strip 74 is positioned intermediate the strips 71 and 72 and is secured by bolts 76 to the sheet metal structural member 77 of the body cowl. Rubber strips 78 and 79 are disposed upon opposite sides of the metal strip 74 and are vulcanized or otherwise suitably bonded to the metal strip 74 and also to the inwardly facing surfaces of the metal strips 71 and 72. It will be seen that the rubber strips are thus placed in shear and function to transmit load between the cowl and the windshield while at the same time providing a limited amount of resiliency to absorb shock loads without injury to the windshield. Although not shown, the joint between the upper edge of the windshield and the roof panel can be formed in similar fashion, with the result that the windshield again forms a structural part of the body construction and eliminates the need for separate windshield side pillars.

Figure 7:
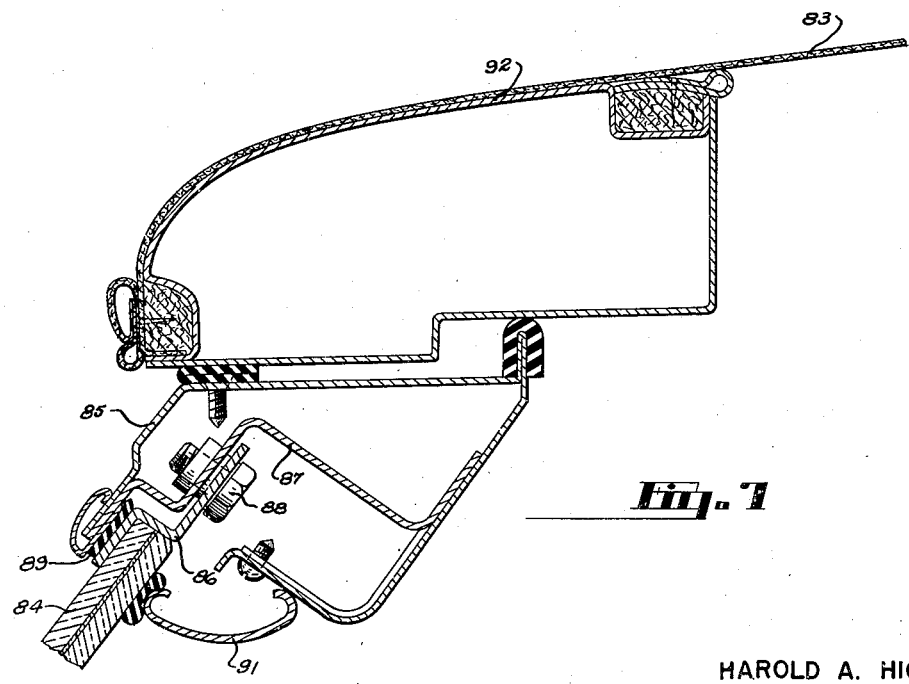
Figure 7 is a cross sectional view through the windshield and the header of a convertible type vehicle body.

Figure 7 illustrates the embodiment of the present invention in a vehicle body of the convertible type, in which the top 83 is adapted to be lowered when desired, leaving the windshield 84 and the windshield header 85 as the only parts of the body extending above the belt line. In conventional convertible construction, the massive windshield side pillars impair the trim appearance of the vehicle when the top is lowered. By applying the principles of the present invention it is possible to entirely eliminate the side pillars, with the result that an extremely attracive appearance can be obtained. In addition, of course, the driver's vision is at the same time greatly enhanced.

A metal strip 86 is cemented to the exterior surface and to the edge of the windshield glass 84 and is bolted to the internal supporting member 87 of the header by bolts 88. As in the other forms, a rubber sealing strip 89 provides a weather seal at the outer side of the windshield while a garnish molding 91 is mounted at the inner side. The top 83 of the convertible body is of conventional construction and comprises a framework 92 at its forward edge adapted to be detachably connected to the windshield header by suitable latch mechanism (not shown). At its lower edge the windshield is connected to the cowl in the same manner as shown in Figure 3, so that the windshield serves as a structural member to support the header and top without side pillars.

It will be understood that the invention is not to be limited to the exact construction shown and described, but that various changes and modifications may be made without departing from the spirt and scope of the invention, as defined in the appended claims.

What is claimed is:

1. In a vehicle body construction, in combination, a cowl panel, a roof panel spaced above said cowl panel, a glass windshield extending between said cowl and said roof panels, and a single metal frame connecting said windshield to said cowl panel and to said roof panel, said metal frame being generally Z-shaped in cross section, the inner flange of said Z-frame being cemented to the marginal portions of the exterior surface of said windshield, the outer marginal flange of said Z-frame being connected to the cowl and roof panels of said body, and the intermediate leg of said Z-frame being cemented to the edges of the glass windshield.

2. In a vehicle body construction, in combination, a cowl panel, a roof panel spaced above said cowl panel, a laminated glass windshield extending between said cowl and roof panels, and a single metal frame connecting said windshield to said cowl panel and to said roof panel, said metal frame being generally Z-shaped in cross section with the inner flange of the frame extending parallel to and cemented to the marginal portions of the exterior surface of the outer lamination of said windshield, the intermediate leg of said Z-frame extending at right angles to the inner flange thereof and being cemented to the exposed edges of the laminations of said windshield, and the outer flange of said Z-frame extending outwardly from the upper and lower portions of said windshield for connection to the roof and cowl panels respectively of said body, said Z-shaped frame and laminated windshield forming the sole structural support between said roof and cowl panels.

HAROLD A. HICKS.

REFERENCES CITED

The following references are of record in the file of this patent:

UNITED STATES PATENTS

| Number | Name | Date |
| --- | --- | --- |
| 1,715,402 | Woodward | June 4, 1929 |
| 2,043,756 | Lalancette | June 9, 1936 |
| 2,171,191 | Potter | Aug. 29, 1939 |
| 2,208,204 | Figroux | July 16, 1940 |
| 2,224,186 | Henri-Labourdette | Dec. 10, 1940 |
| 2,242,746 | Dean | May 20, 1941 |
| 2,342,758 | Saunders et al. | Feb. 29, 1944 |
| 2,437,664 | Hicks | Mar. 9, 1948 |

FOREIGN PATENTS

| Number | Country | Date |
| --- | --- | --- |
| 476,239 | Great Britain | Dec. 6, 1937 |
| 657,664 | France | Jan. 16, 1929 |